UNITED STATES PATENT OFFICE.

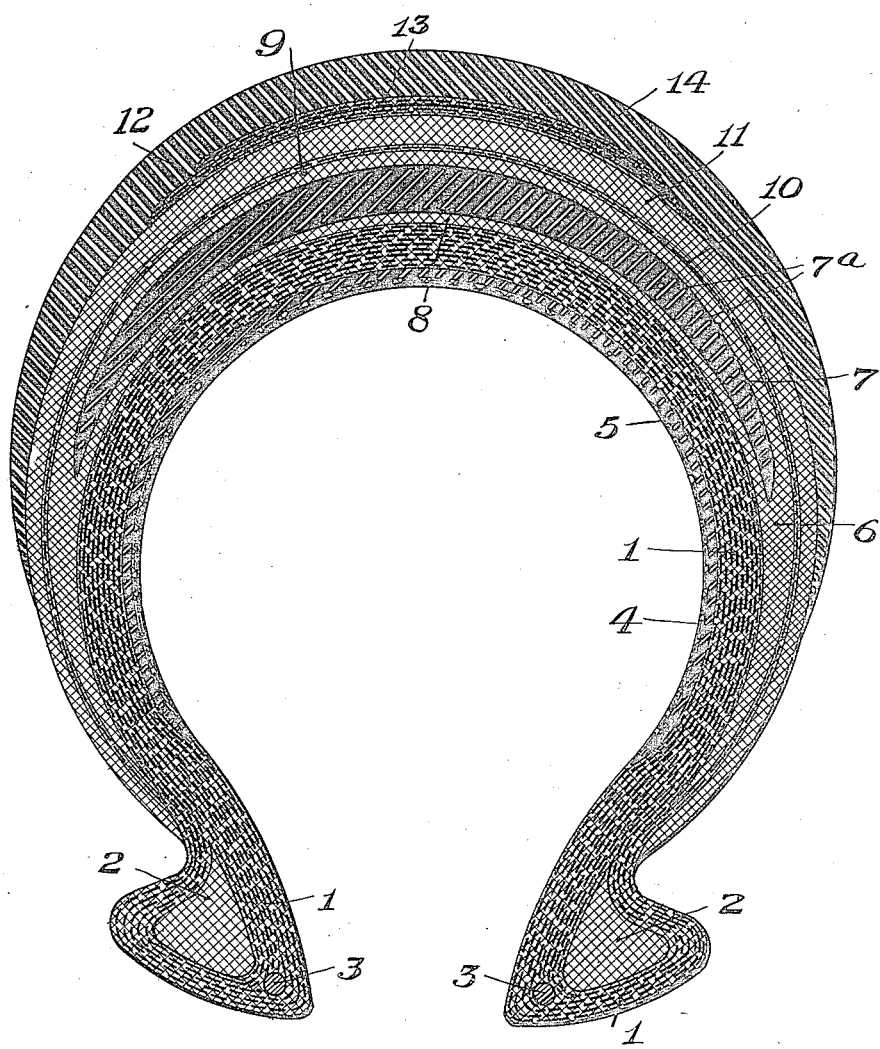

HERMAN JANCOLOVICH, OF PITTSBURGH, PENNSYLVANIA.

PNEUMATIC TIRE.

1,164,190.                     Specification of Letters Patent.      Patented Dec. 14, 1915.

Application filed February 23, 1915.   Serial No. 9,872.

*To all whom it may concern:*

Be it known that I, HERMAN JANCOLOVICH, a citizen of the United States, and a resident of North Side, Pittsburgh, in the county of Allegheny and State of Pennsylvania, have invented a new and useful Improvement in Pneumatic Tires; and I do hereby declare the following to be a full, clear, and exact description thereof.

My invention pertains to pneumatic tires for automobiles and the like.

From time to time tire-constructions have been proposed having in view the prevention of punctures, but such constructions have been subject to certain disadvantages; for instance, where metallic members are inserted in the body of the tire to guard against punctures such members become heated during the running of the tire, causing the disintegration of the rubber.

It is one of the principal objects of my invention to produce a tire in which punctures are efficiently guarded against without impairing the other qualities of the tire, and particularly to produce a puncture proof tire which will not be unduly liable to become heated during use.

It is another object of the invention to produce a tire in which the sides as well as the tread are protected against punctures, without unduly increasing the weight thereof.

Still another object of my invention is to produce a puncture-proof tire, some of the elements of which are such that they may be applied to the foundation portions of an old tire, thereby permitting a worn out tire to be converted, in the course of repair, into the puncture-proof tire of my invention. And other and further objects of the invention will appear from the following description taken in connection with the appended claim.

I have described in the following specification, and shown in the accompanying drawing, one construction of tire embodying my invention; but I wish it understood that the invention may be embodied in other forms than that described and shown without exceeding the scope thereof as defined in the claim.

The drawing is a transverse section taken through a tire embodying my invention, it being understood that each of the elements therein shown extends entirely around the tire.

The form of tire shown comprises a thick layer 1 of fabric, the ends of which are spread in the usual manner to inclose rubber rings 2, and form, with the wires 3, bases for engaging in the rim grooves of the wheel. Within the fabric layer 1 is placed a layer 4 of hard fiber, which extends nearly to the base of the tire, and is covered inside by a thin fabric lining 5. Surrounding the fabric 1 there is a thick tire portion 6 formed of cushion rubber; and in this there is embedded a thick band 7 formed of hard fiber, the said band having thin fabric chafing strips 7ª secured to the top and bottom faces thereof. The band 7 is centrally located and is so placed as to leave a layer 8 of cushion rubber between it and the fabric. Surrounding the fiber band 7, so as to leave a layer 9 of cushion rubber between it and the band, is a fabric binder strip 10, which extends almost to the head of the tire, and assists in holding the fiber band 7 firmly in place. This binder strip 10 is embedded in the tire portion 6, so as to leave a layer of cushion rubber between it and the breaker strip, such layer being thicker at the center than at the sides. Upon the tire portion 6 is placed the breaker-strip, which consists of a band 12 of fabric having a narrower band 13 superposed thereon. Above the breaker strip is the tread portion 14 of the tire, formed of relatively hard rubber. The parts described above are vulcanized together so as to form a solid mass.

The fiber band 7 forms an obstruction which cannot be pierced by glass, nails and such other sharp or pointed articles as might be found upon a road. It thus effectually prevents punctures; and it does this without increasing the liability of the tire to become heated, since fiber has very little tendency to store heat. The cushion layers 8, 9 and 11, and the binder-strip 10, effectually prevent the fiber band from slipping relatively to the other elements of the tire; and the breaker-strip still further assures the firm holding of the said band in place. The thinner fiber layer 4 effectually guards against lateral punctures, since the weight of the machine does not aid the puncturing action to the same extent as in the case of vertical punctures.

The elements described above may be built up originally in a new tire, or they may be applied to the foundation of an old tire, in repairing the latter.

What I claim is:

A pneumatic tire comprising a body portion formed of rubber superposed on fabric, said body portion having a hard relatively thick band embedded therein so as to leave a layer of rubber between itself and the fabric, said band being formed of hard fiber and extending across the tread of the tire, a fabric binder strip outside said band and separated therefrom by a layer of cushion rubber, said binder strip extending beyond the edges of said band, a layer of cushion rubber outside said binder strip, a fabric breaker-strip superposed on said last named layer, an outer covering of relatively hard rubber, and a relatively thin lining also formed of hard fiber and extending along the side walls of the tire.

In testimony whereof, I the said HERMAN JANCOLOVICH have hereunto set my hand.

HERMAN JANCOLOVICH.

Witnesses:
T. B. HUMPHRIES,
CHARLES G. COPE.